United States Patent Office 3,345,401
Patented Oct. 3, 1967

3,345,401
PROCESS FOR PREPARING POLYESTERS AND
RESULTING PRODUCTS
Clayton A. May, Orinda, Calif., assignor to Shell Oil Company, New York, N.Y., a corporation of Delaware
No Drawing. Filed Oct. 19, 1964, Ser. No. 404,948
11 Claims. (Cl. 260—486)

This invention relates to a process for preparing polyesters and the resulting products. More particularly, the invention relates to a new one-step process for preparing hydroxy-substituted unsaturated polyesters to the resulting products and to their use particularly in the preparation of coatings, adhesives, reinforced plastics, moldings and the like.

Specifically, the invention provides a new and highly efficient process for preparing acetone-soluble hydroxy-substituted ethylenically unsaturated polyesters involving only one step which comprises heating and reacting a mixture comprising a polyhydric material, such as a polyhydric phenol, a halo-epoxy-alkane, an ethylenically unsaturated acid and an alkaline material, and preferably a catalyst, such as, for example, benzyldimethylamine, and recovering the desired acetone-soluble polyester from the resulting product.

As a special embodiment, the invention provides a new one-step process for preparing soluble hydroxy-substituted polyethylenically unsaturated polyesters of the formula

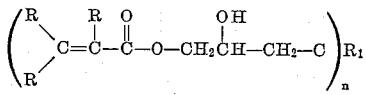

wherein $n$ is an integer of at least 2, and preferably 2 to 4, $R_1$ is a moiety derived from a polyhydric phenol by removing the OH groups and R is hydrogen or an organic radical, which comprises heating and reacting a mixture containing a polyhydric phenol, epichlorohydrin, an acrylic acid and an alkaline catalyst, such as NaOH, and recovering the desired product.

Cured polyepoxides have many desired properties, such as solvent and chemical resistance and good adhesion to metal, and there has been a desire to transfer many of these properties over to the conventional polyester type products. I have found that this can be accomplished by reaction of the polyepoxides with an unsaturated carboxylic acid, such as acrylic or methacrylic acid. The products prepared in this manner are easily handled, combine readily with other unsaturated materials, such as styrene, cure in the presence of peroxide catalysts to form products having the desired characteristics of the polyepoxides as well as those of the unsaturated polyesters.

The known methods for making these new polyesters, however, have been rather expensive for use on large commercial scale. It has been necessary, for example, to first prepare the polyepoxide by reacting the epichlorohydrin with a polyhydric phenol, recovering the product and then reacting this product with an unsaturated acid in the presence of a catalyst such as an amine or onium compound. This two step method adds considerable cost to the product.

It is an object of the invention, therefore, to provide a new process for preparing hydroxy-substituted polyesters. It is a further object to provide a new process for preparing hydroxy-substituted unsaturated polyesters by a one-step method. It is a further object to provide an economical and efficient one-step method for preparing polyesters from phenols, halo-epoxy-alkanes and acids. It is a further object to provide a process for preparing unsaturated polyesters which are particularly useful for preparation of reinforced plastic products, moldings, encapsulating products, adhesives and the like. It is a further object to provide new unsaturated polyesters which are particularly useful for filament winding operations. These and other objects of the invention will be apparent from the following detailed description thereof.

It has now been discovered that these and other objects may be accomplished by the process of the invention comprising heating and reacting a mixture comprising polyhydric compound, a halo-epoxy-alkane, an ethylenically unsaturated acid and an alkaline catalyst, and recovering the desired acetone-soluble polyester. It has been unexpectedly found that the formation of the desired unsaturated polyesters can take place directly from the basic ingredients in the one-step method despite the complicated nature of the reaction. The resulting product has substantially the same properties as the polyester obtained by the more complicated two-step method and can be used in the same applications as indicated hereinafter.

The polyhydric material used in the process of the invention includes the polyhydric alcohols, as the alkanediols, alkanetriols and the like, such as glycerol, hexanetriol, pentaerythritol, polyvinyl, alcohol and the like, partial ethers and esters thereof and various kinds of polyhydric phenols. Preferred materials include the di-, tri- or higher polyhydric phenols. Typical phenols include those having phenolic hydroxyl groups attached to non-adjacent ring carbon atoms, such as resorcinol,
hydroquinone,
chlorohydroquinone,
methyl resorcinol,
phloroglucinol,
1,5-dihydroxynaphthalene,
4,4'-dihydroxydiphenyl,
bis(hydroxyphenyl)methane,
1,1-bis(4-hydroxyphenyl)ethane,
1,1-bis(4-hydroxyphenyl)isobutane,
2,2-bis(4-hydroxyphenyl)propane, which is termed bisphenol herein for convenience,
2,2-bis(2-hydroxy-4-tert-butylphenyl)propane,
2,2-bis(2-hydroxyphenyl)propane,
2,4'-dihydroxydiphenyldimethylmethane,
2,2-bis(2-chloro-2-hydroxyphenyl)propane,
2,2-bis(2-hydroxynaphthyl)pentane,
2,2-bis(2,5-dibromo-4-hydroxyphenyl)butane,
4,4'-dihydroxybenzophenone,
1,3-bis(4-hydroxyphenyloxy)-2-hydroxypropane,
3-hydroxyphenyl salicylate,
4-salicoyl aminophenol, as well as more complex polyhydric phenols such as novolac resins obtainable by acid catalyzed condensation of phenol, p-cresol, or other substituted phenols with aldehydes such as formaldehyde, acetaldehyde, crotonaldehyde, etc.; condensates of phenols with cardanol such as described in U.S. 2,317,607; condensates of phenols with aliphatic diols such as described in U.S. 2,321,620; and condensates of phenols with unsaturated fatty oils such as described in U.S. 2,031,586; and condensates of phenols with di- or polyfunctional aldehydes, such as glyoxal and the like. The preferred polyhydric phenols contain 2 or more phenolic hydroxyl groups in the average molecule thereof and are free of other functional groups.

Another component used in the process of the invention comprise the halo-epoxy-substituted alkanes. As used herein, this expression refers to those alkanes having a vic-epoxy group, i.e., a

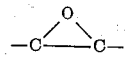

group, attached directly to a halogen bearing carbon atom, such as, for example, epichlorohydrin, epibromohydrin, 1,4-dichloro-2,3-epoxybutane, 1-chloro-2,3-epoxypentane and the like. Especially preferred are the halo-epoxysubstituted alkanes containing no more than 12 carbon atoms, and preferably from 3 to 8 carbon atoms. Coming under special consideration, particularly because of the superior nature of the products obtained therein is epichlorohydrin.

The other component in the reaction comprises an organic carboxylic acid which possesses at least one ethylenic linkage and possess one, two or more carboxyl groups. The preferred acids include the mono- and dicarboxylic acids, such as acrylic acid, methacrylic acid, cyclohexenecarboxylic acid, 2,4-octadienecarboxylic acid, maleic acid, crotonic acid, alpha-phenylacrylic acid, alpha-cyclohexylacrylic acid, alpha-chloromaleic acid, tetrahydrophthalic acid, itaconic acid, fumaric acid, cyanoacrylic acid, ethoxyacrylic acid, and the like.

Also useful are the partial esters of the unsaturated polycarboxylic acids, such as, for example, allyl hydrogen maleate, butyl hydrogen maleate, allyl hydrogen tetrahydrophthalate, cyclohexenyl hydrogen maleate, cyclohexyl hydrogen tetrahydrophthalate, and the like, and mixtures thereof.

Coming under special consideration, particularly because of the fine properties of the resulting products, are the ethylenically unsaturated monocarboxylic acids containing 3 to 12 carbon atoms, and the ethylenically unsaturated dicarboxylic acids containing 3 to 15 carbon atoms, and the alkenyl and alkyl partial esters of these acids wherein the alcohol portion of the ester contains from 1 to 8 carbon atoms.

Another component in the reaction mixture is an alkaline material. Preferred alkaline materials include the alkali metal hydroxides, such as sodium hydroxide, potassium or lithium hydroxide.

It is preferred to employ a catalyst in the reaction mixture. Suitable catalysts for the epoxide-acid reaction includes the tertiary amines, such as benzyldimethylamine, tributylamine, trihexylamine, benzyldibutylamine dimethylaminophenol and the like; onium salts, and preferably those containing phosphorous, sulfur or nitrogen, such as the phosphonium, sulfonium and ammonium salts of inorganic acids, such as benzyltrimethylammonium sulfate, diphenyldimethylammonium chloride, benzyltrimethylammonium chloride, diphenyldimethylammonium nitrate, diphenylmethylsulfonium chloride, tricyclohexylsulfonium bromide, triphenylmethylphosphonium iodide, diethyldibutylphosphonium nitrate, trimethylsulfonium thiocyanate, triphenylsulfonium chloride, dicyclohexyldiamylphosphonium iodide, benzyltrimethylammonium thiocyanate, and the like, and mixtures thereof.

The amount of the polyhydric compound, epihaloalkane and acid to be used in the reaction may vary over a wide range. In general, one should employ at least one mole of the halo-epoxy-alkane and acid per OH group to be reacted. If the polyhydric compound is trifunctional, one should preferably employ at least three moles of the halo-epoxy-alkane and acid per mole of the polyhydric compound. Particularly preferred mole ratios for the polyhydric compound, halo-epoxy-alkane and acid vary from about 1:2.2 to 1:8.8.

The amount of the alkaline material employed will vary over a considerable range. Preferably the amount of the alkaline material used should be about one mole per mole of OH group on the polyhydric compound to be reacted. In making the product from dihydric phenols and epichlorohydrin, the amount of the alkaline material, such as the alkaline metal hydroxides employed will vary from about 2.0 to 2.2 moles per mole of the dihydric phenol.

The alkaline material may be added all at once or in small increments during the reaction. The alkaline material may be added as such or as an aqueous solution. The concentrations of the aqueous solutions preferably vary from about 5% to 80%.

The amount of the catalyst employed may vary over a wide range. In general, amounts of catalyst used vary from about .05% to about 5% by weight and more preferably from about .1% to 3% by weight of the reactants.

The reaction may be conducted in the presence or absence of solvents or diluents. In most cases, the reactants will be liquid and the reaction may be easily effected without the addition of solvents or diluents. However, in some cases, where either or both reactants are solids or viscous liquids it may be desirable to add diluents to assist in effecting the reaction. Examples of such materials include the inert liquids, such as methyl ethyl ketone, acetone, benzene, methanol, xylene, toluene, cyclohexane and the like.

Temperatures employed in the reaction will generally vary from about 40° C. to about 120° C. In most cases, the reactants will combine in the presence of the catalysts at a rapid rate and lower temperatures will be satisfactory. Particularly preferred temperatures range from about 40° C. to 65° C.

The reaction will be preferably conducted under atmospheric pressure, but it may be advantageous in some cases to employ subatmospheric or superatmospheric pressure.

The process of the invention may be effected by merely combining the above-noted ingredients, stirring and heating. The preferred method comprises adding the polyhydric compound and epichlorohydrin to the solvent, then adding the acid and finally adding the alkaline catalyst. The mixture is then brought to the desired temperature. At the conclusion of the reaction, the mixture may then be distilled or stripped to remove any of the necessary components, such as solvents, catalyst, excess reactants and the like.

If solvents are employed in the reaction, and the resulting product is to be used for coating purposes, the solvent can be retained with the product. Otherwise, the solvent may be removed by any suitable method such as distillation and the like. The alkaline materials and by-product salts can be removed by suitable means, such as neutralization, filtration, water washing and the like. The excess reactants, if employed may be removed by conventional means, such as stripping and the like.

The polyester products obtained by the above process will vary from liquids to solid resins. The new products will possess a plurality of free OH groups, and in the case of the unsaturated acids, possess a plurality of ethylenic groups, and will be reactive through these groups. The products will be of higher molecular weight than the basic polyepoxide from which they are theoretically formed and will possess at least two acid groups per polyepoxide unit.

The polyesters will also possess a linear structure, i.e., free of cross-linking. As a result they will be soluble in acetone and other conventional solvents. They will be relatively non-heat reactive, i.e., difficult to body by heating alone. However, constant application of heat may cause them to suddenly gel.

The polyesters will be compatible and soluble in a great variety of different materials. They will be compatible, for example, with various oils, tars, resins and the like, and with a great variety of different types of unsaturated monomers. Examples of such monomers include, among others, aromatic compounds such as styrene, alphamethylstyrene, dichloro-styrene, vinyl naphthalene, vinyl phenol and the like, unsaturated esters, such as acrylic and methacrylic esters, vinyl acetate, vinyl benzoate, vinyl chloroacetate, vinyl laurate, and the like, unsaturated acids, such as acrylic and alpha-alkylacrylic acids, butenoic acid, allylbenzoic acid, vinylbenzoic acid, and the like, halides, such as vinyl chloride, vinylidene chloride, nitriles, such as acrylonitrile, methacrylonitrile, diolefins, such as butadiene, isoprene, methylpentadiene, esters of polycarboxylic acids, trialkylcyanumate, such as diallyl phthalate, divinyl succinate, diallyl maleate, divinyl adipate, dichloroallyl tetrahydrophthalate, and the like, and mixtures thereof.

The new hydroxy-substituted polyesters may be polymerized alone in combination with any of the above-noted unsaturated monomers to form valuable polymeric products. When used in combination with the above components, the amount of the other components may vary over a wide range, but it is generally preferred to have at least 15% by weight of the polyester present. In working with components, such as the aromatic unsaturated monomers, such as styrene, it is preferred to utilize from 1% to about 65% of the dissimilar monomer and from 99% to 35% of the new hydroxy-substituted polyester.

The polymerization of the above-noted polyesters or mixtures of monomers may be accomplished by any suitable method. The preferred method comprises heating the monomer of mixture of monomers in the presence of a free radical yielding catalyst. Examples of such catalysts includes the peroxides, such as benzoyl peroxide, methyl ethyl ketone peroxide, tertiary butyl hydroperoxide, ditertiary butyl peroxide, hydrogen peroxide, potassium persulfate, methyl cyclohexyl peroxide, cumene hydroperoxide, acetyl benzoyl peroxide, tetralin hydroperoxide, phenylcyclohexane hydroperoxide, tertiary butylisopropylbenzene hydroperoxide, tertiary butyl peracetate, tertiary butylacetate, tertiary butyl perbenzoate, ditertiary amyl perphthalate, ditertiary butyl peradipate, tertiary amyl percarbonate, and the like, and mixtures thereof; azo compounds such as 2,2-azobisisobutyronitrile, dimethyl 2,2'-azobisisobutyrate, 2,2'-azobis(2,4-dimethylvalero)nitrile, 2,2'-azobisisobutylamide, and the like. Particularly preferred catalysts include the diaroyl peroxide, tertiary alkyl hydroperoxides, alkyl peresters of percarboxylic acids and particularly those of the above-noted groups which contain no more than 18 carbon atoms per molecule and have a decomposition temperature below 150° C.

Other materials may also be added to the mixtures before or during polymerization. This includes plasticizers, stabilizers, extenders, oils, resins, tars, asphalts and the like, as well as all types of coloring or pigments to give the material the desired color.

The above-noted components may be mixed in any order and then the combined mixture heated to the desired temperature. Temperatures employed in the polymerization will vary depending upon the reactants and catalyst selected. In general, polymerization temperatures may vary from about 20° C. to about 250° C. and more preferably from 20° C. to 150° C.

The unsaturated polyesters and their above-noted mixtures with other monomers may be utilized in a wide variety of different applications. They may be utilized in the preparation of coatings and impregnating compositions, in the preparation of adhesives for metals, wood, cement and the like, and in the preparation of reinforced composite products, such as laminated products, filament windings and the like. In this latter application, the polyester compositions are applied to the fibrous products, such as glass fibers or sheets, the material formed into the desired object and heated to effect cure of the polyester composition. The unsaturated polyesters also find use as encapsulating resins, i.e., for use in encapsulating electric motors, radio parts and the like.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts are parts by weight.

Example I

This example illustrates the preparation of a hydroxy-substituted unsaturated polyester by the process of the invention using 2,2-bis(4-hydroxyphenyl)propane, epichlorohydrin, methacrylic acid and caustic.

228 parts (1 mol) of 2,2-bis(4-hydroxyphenyl)propane and 185 parts (2 mols) of epichlorohydrin were added to a reaction flask containing 325 parts of benzene and 125 parts of water. To this mixture was added slowly 172 parts (2 mols) of methacrylic acid over a period of 20 minutes. The mixture was warmed to 60° C. and the heat removed. 82 parts (2.04 mols) sodium hydroxide was then added over a period of 15 minutes. The mixture exothermed to about 70° C. The mixture was then heated to reflux and the heating continued for about 40 minutes. 400 parts of benzene was then added and the mixture stripped of water. The charge was filtered and methyl ethyl ketone added to promote salt crystallization. The product was washed to remove alkaline material and stripped under vacuum. The recovered product was a viscous liquid polyester of the structure:

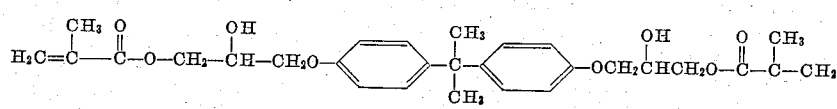

Analyses: Ester value 0.292 eq./100 g., OH 0.53 eq./100 g., acidity 0.002 eq./100 g. The product was soluble in acetone, benzene and toluene.

The polyester prepared above was combined with 0.5% ditertiary butyl peroxide and the mixture heated at 115° C. The resulting product was a hard tough solvent and chemical resistant product.

The polyester prepared above was also combined with styrene in a ratio of 95/5, 90/10, 80/20 and 60/40, and the mixture combined with .5% ditertiary butyl peroxide and heated at 115° C. These products were also hard and tough and had good resistance to chemicals, solvent and water. These styrene diluted compositions are useful in the preparation of glass fiber laminated products.

Example II 228 parts of bis(4-hydroxyphenyl)propane and 1.85 parts of benzyldimethylamine were added to 500 parts of methyl ethyl ketone in a reaction vessel. The mixture was heated to 60° C. and 185 parts of epichlorohydrin added. 172 parts of glacial methacrylic acid was added and then 84 parts of sodium hydroxide added over a period of 15 minutes. The mixture was heated to reflux at 83° C. for 4 hours. The mixture was stripped of solvent. 500 parts of benzene added and then added 10 parts of 37% HCl with 50 parts of water to neutralize. The mixture was filtered, washed combined with sodium sulfate and filtered. The mixture was stripped to 70° C. to yield the desired unsaturated polyester as in Example I.

Example III

Examples I and II are repeated with the exception that the methacrylic acid is replaced with acrylic acid. Related results are obtained.

Example IV

Examples I and II are repeated with the exception that 2,2-bis(4-hydroxyphenyl)propane is replaced with resorcinol. Related results are obtained.

Example V

Examples I to IV are repeated using KOH instead of NaOH. Related results are obtained.

Example VI 600 parts of 2,2-bis(4-hydroxy-3,5-dibromophenyl)propane and 185 parts of epichlorohydrin are added to a reaction flask containing 325 parts of benzene and 125 parts of water. To this mixture is added slowly 172 parts of methacrylic acid over a period of 20 minutes. The mixture was warmed to 60° C. and the heat removed. 82 parts of sodium hydroxide was then added over a period of about 15 minutes. The mixture exothermed and was heated to reflux. The heating was continued for about 40 minutes. The product was then worked up as in Example I to yield a viscous liquid unsaturated polyester of the formula

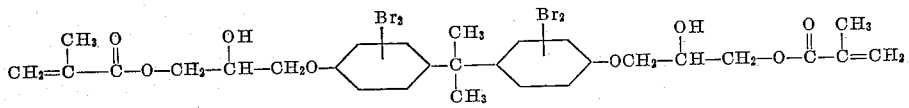

The polyester prepared above was combined with 0.5% ditertiary butyl peroxide and the mixture heated at 115° C. The resulting product was a hard tough solvent and chemical resistant product. The product also was fire resistant.

The polyester prepared above was also combined with styrene in a ratio of 95/5, 90/10, 80/20, and 60/40 and the mixture combined with .5 ditertiary butyl peroxide and heated at 115° C. These products are also hard and tough and have good resistance to chemicals, solvent and water. These styrene diluted compositions are useful in the preparation of glass fiber reinforced products.

I claim as my invention:

1. A one-step process for preparing acetone-soluble hydroxy-substituted polyester which comprises heating at a temperature between 40° C. and 120° C. a mixture comprising a polyhydric phenol which contains no functional groups other than the phenolic OH group, a halo-epoxy-alkane having the epoxy

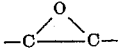

group attached to a halogen-bearing aliphatic carbon atom, an alpha, beta-ethylenically unsaturated carboxylic acid and an alkaline material in an amount varying from 1 to 1.2 moles per phenolic OH group, the mole ratio of phenol, halo-epoxy-alkane and acid varying from 1:2:2 to 1:8:8.

2. A process for preparing acetone-soluble hydroxy-substituted polyesters which comprises heating at a temperature between 40° C. and 120° C. a mixture comprising a polyhydric phenol free of functional groups other than the phenol OH groups, an epihalohydrin, an ethylenically unsaturated monocarboxylic acid, an alkali metal hydroxide in an amount varying from 1 to 1.2 moles per phenolic OH groups of the formula

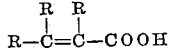

wherein R is hydrogen or an alkyl radical, and a tertiary amine catalyst, the mole ratio of phenol, epihalohydrin and acid varying from 1:4:2 to 1:8:3.

3. A process as in claim 2 wherein the polyhydric phenol is a bis(hydroxyphenyl)alkane.

4. A process as in claim 2 wherein the epihalohydrin is epichlorohydrin.

5. A process as in claim 2 wherein the unsaturated monocarboxylic acid is acrylic acid.

6. A process as in claim 2 wherein the unsaturated monocarboxylic acid is methacrylic acid.

7. A process as in claim 2 wherein the reaction is conducted at a temperature between 40° C. and 100° C.

8. A process as in claim 2 wherein the alkali metal hydroxide is sodium hydroxide.

9. A process as in claim 2 wherein the polyhydric phenol is 2,2-bis(4-hydroxyphenyl)propane.

10. A process as in claim 2 wherein the tertiary amine is benzyldimethylamine.

11. A process for preparing acetone-soluble hydroxy-substituted unsaturated polyesters of the formula

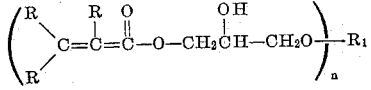

wherein $n$ is an integer of at least 2, R is a member of the group consisting of hydrogen and alkyl radicals and $R_1$ is a moiety derived from a polyhydric phenol by removing the OH groups, said phenol having no functional groups other than the phenolic OH groups, which comprises heating at a temperature between 40° C. and 120° C. a mixture containing a polyhydric phenol $R_1(OH)_n$, epichlorohydrin and an acrylic acid in the presence of sodium hydroxide, the amount of the hydroxide varying from 1.2 to 2 moles per mol of the polyhydric phenol, the mol ratio of phenol, epihalohydride and acid varying from 1:4:2 to 1:8:3.

References Cited

UNITED STATES PATENTS

| | | | |
|---|---|---|---|
| 2,424,851 | 2/1958 | Hall | 260—47 XR |
| 2,839,494 | 6/1958 | Reese | 260—47 |
| 3,066,112 | 11/1962 | Bowen | 210—47 XR |

WILLIAM H. SHORT, *Primary Examiner.*

T. D. KERWIN, *Assistant Examiner.*